United States Patent [19]

Sakamoto

[11] Patent Number: 4,549,235
[45] Date of Patent: Oct. 22, 1985

[54] APPARATUS FOR REPRODUCING VIDEO SIGNALS

[75] Inventor: Hitoshi Sakamoto, Zama, Japan

[73] Assignee: Sony Corporation, Tokyo, Japan

[21] Appl. No.: 670,669

[22] Filed: Nov. 13, 1984

Related U.S. Application Data

[63] Continuation of Ser. No. 445,848, Dec. 1, 1982, abandoned.

[30] Foreign Application Priority Data

Dec. 4, 1981 [JP] Japan ............................ 56-194074

[51] Int. Cl.⁴ .......................................... H04N 5/78
[52] U.S. Cl. ................................ 360/10.2; 360/10.3; 360/78; 358/907
[58] Field of Search ................... 360/10.1, 10.2, 10.3, 360/75, 77, 78; 358/907; 369/43, 47

[56] References Cited

U.S. PATENT DOCUMENTS 4,296,443 10/1981 Sakamoto et al. ............... 360/10.2
4,393,417 7/1983 Kobayashi et al. ............... 360/10.3

FOREIGN PATENT DOCUMENTS 2030346 4/1980 United Kingdom .

Primary Examiner—Robert L. Richardson
Attorney, Agent, or Firm—Lewis H. Eslinger; Alvin Sinderbrand

[57] ABSTRACT

An apparatus for reproducing video signals recorded on a recording medium in successive parallel tracks having a predefined pitch and which are skewed relative to a direction of movement of the medium comprises a signal transducer which repeatedly scans the recording medium in a direction along the tracks for reproducing the video signals from the successive tracks upon movement of the medium at a predetermined speed, a transducer deflecting device which is responsive to drive signals and which deflects the signal transducer in a direction transverse to the direction of the tracks, a circuit which generates a plurality of types of jump signals of different respective amplitudes to cause the transducer deflecting device to select the track scanned by the signal transducer, each type of jump signals corresponding to a displacement of the signal transducer by a respective number of track pitches, a phase detector which detects a phase signal included in the video signal reproduced by the signal transducer and which generates reproduced phase signals therefrom, a speed detector which detects the predetermined speed of the medium and which generates detected speed signals in response thereto, a selector responsive to control signals selectively supplying one of the types of jump signals to the transducer deflecting device when the signal transducer reaches an end of each of the successive tracks, and a controller responsive to the reproduced phase signals and the detected speed signals and which generates the control signals for the selector.

6 Claims, 6 Drawing Figures

APPARATUS FOR REPRODUCING VIDEO SIGNALS

This is a continuation of application Ser. No. 06/445,848, filed Dec. 1, 1982 and now abandoned.

BACKGROUND OF THE INVENTION

The present invention relates to an apparatus for reproducing video signals in which the position of a rotary magetnic head is controlled transverse to successive parallel tracks formed obliquely with respect to the longitudinal direction of tape, so that tracking control may be performed in accordance with the reproducing tape speed.

In a video tape recorder (to be referred to as a VTR for brevity hereinafter) wherein video signals of one field are recorded on a single oblique track, framing control is performed during reproduction so as to make the odd and even fields of reproduced video signals and of external reference synchronizing signals repectively coincide with each other. A certain type of VTR has a check function for checking the coincidence between the odd and even fields determined by the synchronizing signals (i.e., vertical, horizontal, bursts and so on) included in the reproduced video signals with those of the external video signals. If they do not coincide, a control signal is supplied to a capstan servo system to shift the reproducing track phase. In another type of VTR, a method is adopted wherein framing control is performed by adding odd/even information of the field to a control signal CTL recorded on the edge of the tape, and operating the capstan servo system by the control signal. This method is adopted in the type C standards of the SMPTE (society of Motion Picture and Television Engineers) for broadcasting 1/inch VTR.

Framing control is performed in general VTRs in the ways described above. However, other problems are encountered in another type of VTR which has a movable head for reproduction at various speeds (a dynamic tracking head). In a VTR of the dynamic tracking type, a rotary magnetic head is mounted on an electromechanical converting element such as a bimorph leaf, and the position of the rotary magnetic head is controlled in the direction perpendicular to the scanning direction thereof (that is, widthwise). In a VTR of this type, while reproduction is being performed, tracking error between the recording tracks formed on magnetic tape and a head tracing path is corrected. For this reason, high-quality images may be reproduced without guard band noise in a variety of speed reproduction modes such as slow, still, fast and reverse.

In a VTR with a dynamic tracking head of this type, simultaneously with correction of the tracking error, head jump (or track jump) is performed after tracing each track for selecting the next scanning track. However, when such a jump (position control) of the head is performed, the odd/even order of the reproduced signal fields may be disturbed in each of the various speed reproduction modes such as slow, still, and fast. For example, a VTR is known which has a tracing control system which makes a head jump to a next track which is closest to the head when the head position control amount (displacement) exceeds a predetermined value at the terminal end of a track. However, an unexpected track change may be made with track deformation of less than 100 μm, which disturbs the odd/even order of the reproduced signal fields.

In order to solve this problem, a system has been proposed whereby the odd/even order may not be disturbed wherein the odd/even information of the reproduced, signal fields is compared with that of an external reference synchronizing system, and the comparison results are added to the conditions for making a head jump. However, such a system requires extra detectors and more often causes erratic operation due to an increased number of jump conditions.

The present invention has been made in consideration of this and has for its object to provide a head position control system which may not cause disturbance in the odd/even order of the reproduced signal fields.

DETAILED DESCRIPTION OF THE PREFERRED EMBODIMENT

The preferred embodiment of the present invention will now be described with reference to the accompanying drawings.

Figure 1:
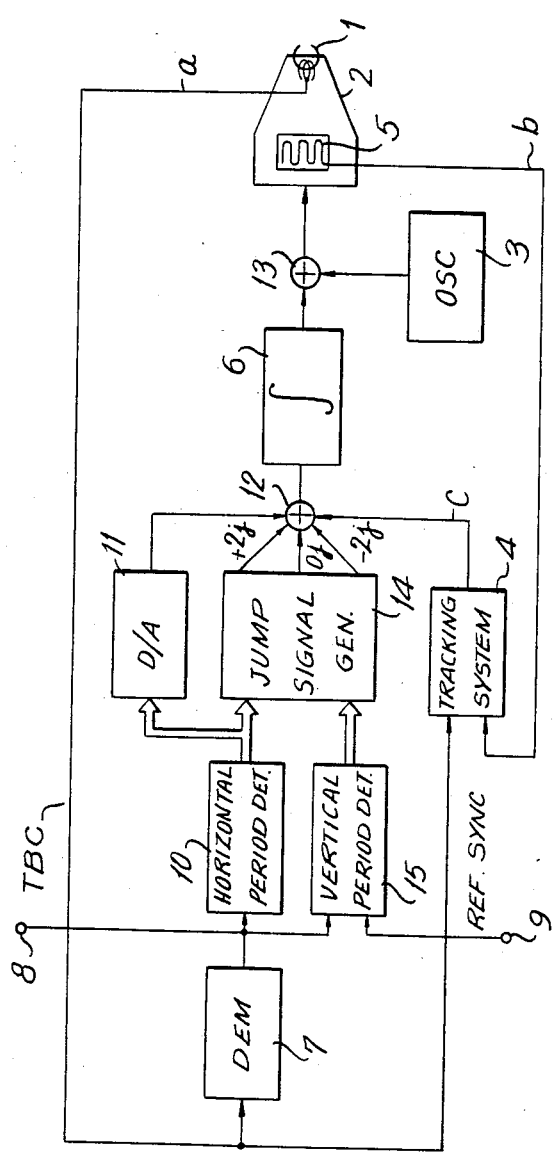
FIG. 1 is a block diagram of a head position control system of a VTR according to the present invention.

FIG. 1 is a block diagram of a head position control system for a VTR to which the present invention may be applied. Referring to FIG. 1, a video magnetic head 1 is mounted on a rotary drum through a bimorph leaf 2 such that the position of the head 1 may be controlled widthwise along the tracks. During scanning of a video track, the bimorph leaf 2 is wobbled by an output from an oscillator 3. The level of a reproduced signal a reproduced by the head 1 is amplitude-modulated by wobbling. The reproduced signal a is supplied to a tracking system 4 which shapes the envelope thereof in accordance with an output b from a strain gauge 5 for detecting the movement of the bimorph leaf 2, and which produces a tracking error signal c. The tracking error signal c is supplied to the bimorph leaf 2 through an integrating driver circuit 6, thereby correcting the error between the head and track.

A tracking system as described above is described, for example, in Japanese Patent Application No. 52-158188.

The reproduced signal a from the head 1 is also supplied to a demodulator 7 which demodulates the FM signal. An output from the demodulator 7 is supplied trhough a terminal 8 to a time base corrector (TBC; not shown) which corrects the time base during a selected speed reproduction mode. The output from the demodulator 7 is also supplied to a horizontal period detector 10 which comprises, for example, a counter to detect the period of the horizontal synchronizing signals included in the reproduced signals. Digital data output from the horizontal period detector 10 represents deviation H of the frequency (period) of the horizontal synchronizing signals reproduced in the selected speed reproduction mode. If $\alpha=2.5H$ where H is the horizontal period, H is $+\alpha/262.5$ at a tape speed (double speed) twice the normal tape speed (unit speed).

The frequency deviation H representing the deviation in the tape speed from the normal tape speed in a selected speed reproduction mode is supplied to a D/A converter 11 to be converted into an analog signal of suitable level. The analog signal or inclination correction signal to correct the inclination error between the track and the head tracing path is supplied to the integrating driver circuit 6 through an adder 12. The inclination correction signal supplied to the integrating driver circuit 6 is integrated with a suitable time constant to produce an inclination correction voltage which is applied to the bimorph leaf 2 through another adder 13. As a result, reproduction is performed with the head tracing path coinciding with the track.

The frequency deviation H produced by the horizontal period detector 10 is also supplied to a jump signal generator 14. A vertical phase detector 15 detects the phase difference (lead/lag) between the vertical synchronizing signal included in the reproduced video signal and an external reference synchronizing signal REF.SYNC. The vertical phase detector 15 may comprise a counter which obtains digital data corresponding to the phase difference V. A phase difference between the vertical synchronizing signal and a reference vertical synchronizing signal is generated by a deviation of the head from the track. The vertical synchronizing signal lags behind the reference vertical synchronizing signal by $\alpha$ (2.5H) in the still reproduction mode, while it leads by $\alpha$ in the double speed reproduction mode.

Figure 2:
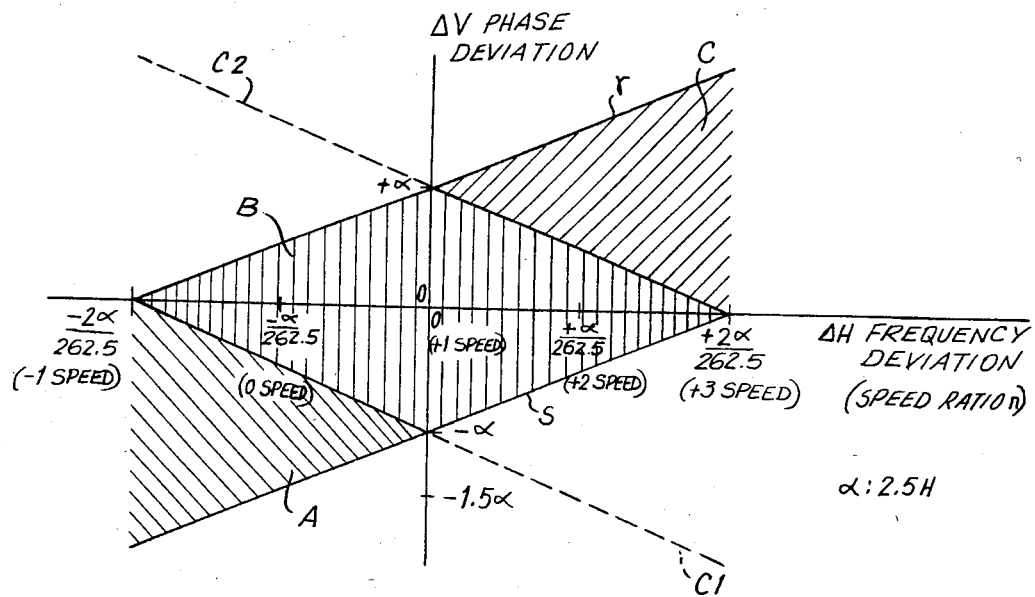
FIG. 2 is a graph showing the regions of head jump pitches.

The basic principle of the jump signal generator 14 is disclosed in, for example, Japanese Patent Application No. 53-110174. According to this principle, as shown in FIG. 2, the jump pitch is classified into regions A, B and C by a plurality of boundary lines C1, C2 and so on in a system of coordinates H and V. The jump signal generator 14 discriminates the region in FIG. 3 containing the data H and V detected by the detectors 10 and 15, respectively, and produces a jump signal j of suitable level. The jump signal j is supplied to the integrating driver circuit 6 through the adder 6. The integrating driver circuit 6 generates a jump voltage of stepped waveform in a jump period (video blanking period) during which the head does not scan a track. The jump voltage is applied to the bimorph leaf 2 through the adder 13.

According to the embodiment of the present invention, the jump pitch is limited to 2 pitch, 0 pitch and $-2$ pitch (that is, even multiples of the track pitch) so that the odd/even order of the fields may not be disturbed irrespective of the type of jump actually made. In a 2 pitch jump during forward reproduction, the head jumps from the terminal end of a current track to the initial end of the preceding adjacent track. In a 0 pitch jump during forward reproduction, a so-called track jump is made wherein the head jump is not made but the head tracing path moves from the terminal end of the current track to the initial end of the next track adjoining in tape feeding direction. In a 0 pitch jump during reverse reproduction, the head tracing path moves back to the preceding track. In a $-2$ pitch jump during reverse reproduction, the head moves to the initial end of the next track.

In a jump of any type, the head tracing path moves to an adjacent track after completing each track scanning. Therefore, the odd/even order of the fields of the reproduced signals may not be disturbed as long as the track patterns on the tape have alternate odd and even fields. In the VTR of the embodiment of the present invention, the capstan servo system operates to make the odd/even order of the fields of the reproduced signals coincide with that of the external reference signal. Thereafter, slow or still reproduction is performed under the trace control of 2 pitch jumps as described above.

Figure 3:
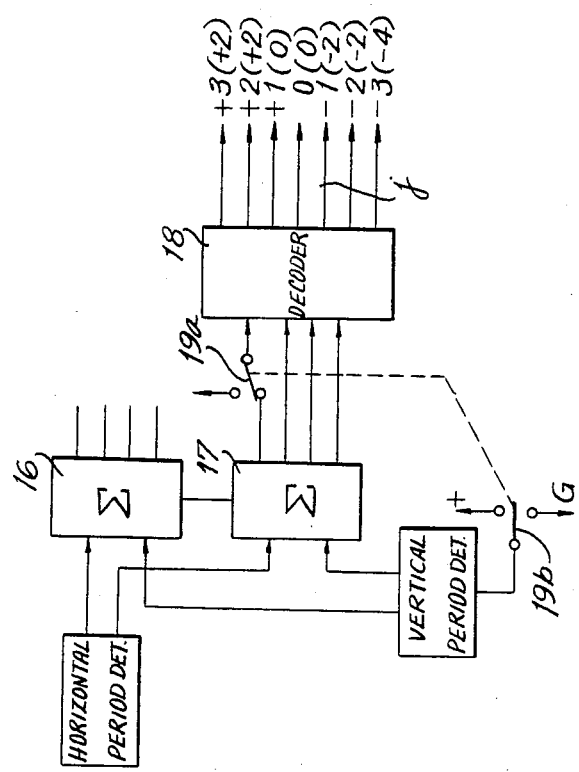
FIG. 3 is a block diagram of a jump signal generator.
Figure 4:
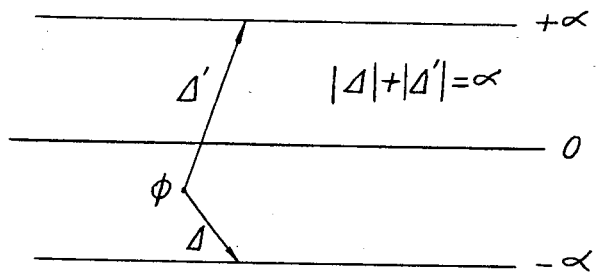
FIGS. 4 and 5 are graphs for explaining FIGS. 2 and 3.
Figure 5:
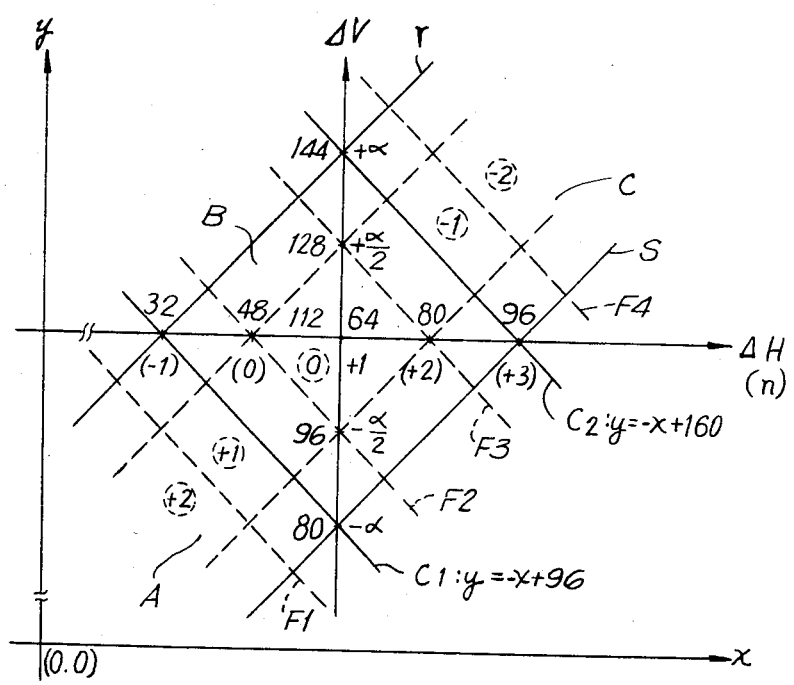

FIG. 3 is a block diagram of the jump signal generator 14 shown in FIG. 1, and FIGS. 4 and 5 are graphs for explaining FIGS. 2 and 3, respectively.

In the slow and still reproduction modes in the forward direction, the 2 pitch jump and the 0 pitch jump are performed, respectively. In the case of the 0 pitch jump, if the reproducing phase corresponding to the initial end of a scanning track is 0 with respect to the reference, it will have a phase deviation at the terminal end of the track expressed by the following equation:

$$\Delta = (n-1)\alpha < 0 \qquad (1)$$

where $\alpha$ is the H alignment (e.g., 2.5H) as defined above and n is tape speed ratio with respect to normal speed. Since the relative phases of the head and the track deviate from each other in accordance with the speed difference $(n-1)$ with respect to the reference speed 1, the phase deviation $\Delta$ is produced. The phase deviation corresponds to the track and the head tracing path.

In the case of tracing by making $+2$ pitch jumps, a phase deviation of $2\alpha$ is produced at the initial end of the scanning track. Since the phase deviation $\Delta$ as given by equation (1) above is produced by track scanning following this jump, a phase deviation expressed by equation (2) below is produced as the terminal end of the track:

$$\Delta' = 2\alpha + \Delta = n\alpha + \alpha > 0 \qquad (2)$$

The phase deviations $\Delta$ and $\Delta'$ have opposite signs (negative and positive) and hold the following relation:

$$|\Delta| + |\Delta'| = 2\alpha \qquad (3)$$

Therefore, if either a 0 pitch jump or a 2 pitch jump is selected which would cause a phase deviation of $\Delta$ or $\Delta'$ as shown in FIG. 4, the phase deviation of the reproduced signals may not fall outside $\pm\alpha$ and the average value of the phase deviation of the reproduced signals is minimized. However, ths result is obtained by only comparing a typical phase reproduced signal at a predetermined point on a track with an external reference phase signal corresponding thereto, and by considering only the phase deviation. Therefore, even if the typical phase reproduced signal is located at the center of a track and its phase deviation with respect to the reference signal is within $\pm\alpha$ as shown in FIG. 4, the reproduced phase at the terminal or initial end of the track deviates from the line of $+\alpha$ or the line of $-\alpha$ in FIG. 4 by $|(n-1)/2|\alpha$.

The phase deivation of the reproduced signal from the terminal end of the track is obtained by correcting the line of $+\alpha$ and the line of $-\alpha$ by the inclination correction amount $\{(n-1)/2\}\alpha$. Hence, lines r and s indicate the magnitudes of the phase deviations. The lines r and s may be expressed by:

$$\text{Line } r: \Delta V = +\alpha + \{(n-1)/2\}\alpha \qquad (4)$$
$$= (n/2)\alpha + \alpha/2$$
$$\text{Line } s: \Delta V = -\alpha + \{(n-1)/2\}\alpha \qquad (5)$$

-continued $$= (n/2)\alpha - (3/2)\alpha$$

The phase difference $\Delta V$ between the vertical synchronizing signal reproduced from the terminal end of the track and the external reference signal fluctuates within a region bound by the lines r and s and indicated by hatched lines in FIG. 2. At this time, the fluctuation in the phase deviation of the reproduced phase at the central point of the track with respect to the reference phase is within the range shown in FIG. 4.

When the phase of the reproduced vertical synchronizing signal at the terminal end of the track is $\phi$ and a 0 pitch jump or a +2 pitch jump is subsequently made to scan the next track, the reproduced phase at the terminal end of this next track will become $(\phi+\Delta)$ or $(\phi+\Delta')$. In order that the reproduced phase may not fluctuate outside the region indicated by the lines in FIG. 4, a jump must be selected (if n<1) to satisfy:

$$\phi+\Delta>s \tag{6}$$

$$\phi+\Delta'<r \tag{7}$$

substitution of equations (1), (2), (4) and (5) in relations (6) and (7) yields:

$$\phi>-\{(\alpha/2)n\}-\alpha/2 \tag{8}$$

$$\phi<-\{(\alpha/2)n\}-\alpha/2 \tag{9}$$

If n<1, and $\phi$ satisfies relation (8), a 0 pitch jump may be made to cause the phase deviation $\Delta$. If n<1, and $\phi$ satisfies relation (9), a +2 pictch jump may be made to cause the phase deviation $\Delta'$. If the jump boundary line determined by relations (8) and (9) is line C1 is FIG. 2 and if $\phi$ comes within region B indicated by the hatched lines (that is, relation (9) is satisfied), a +2 pitch jump may be made.

When n>1, since $\Delta$ is positive and $\Delta'$ is negative, relations (6) and (7) may be respectively rewritten as:

$$\phi+\Delta<r \tag{10}$$

$$\phi+\Delta'>s \tag{11}$$

In a smiilar manner to that describe above, discrimination relations with reference to jump boundary line C2 in FIG. 2 are given as follows:

$$\phi<-\{(\alpha/2)n\}+(3/2)\alpha \tag{12}$$

$$\phi>-\{(\alpha/2)n\}+(3/2)\alpha \tag{13}$$

Thus, if $\phi$ is within the region B indicated by the hatched lines in FIG. 2 (that is, if relation (12) is satisfied), a 0 pitch jump may be made. On the other hand, if $\phi$ is within region C indicated by the hatched lines in FIG. 2 (that is, if relation (13) is satisfied), a −2 pitch jump is made.

Classification or discrimination of jump regions A, B and C (+2, 0, −2) defined by the boundary lines C1 and C2 in FIG. 2 is made by the jump signal generator 14 in FIG. 3. The principle of the generator is based on the disclosure in the specification of Japanese patent Application No. 56-20387 of the present applicant. More specifically, output data $\Delta H$ from the horizontal period detector 10 and output data $\Delta V$ from the vertical phase detector 15 are added by adders 16 and 17. The more significant bits of the sum data obtained are extracted to provide 4-bit jump pitch data in correspondence with the jump regions A, B and C. The jump pitch data is supplied to a decoder 18 to be converted into a jump pulse signal and is then D/A converted. The analog signal obtained is supplied to the integrating driver circuit 6 through the adder 12 shown in FIG. 1 and is then supplied to the bimorph leaf 2 as a step voltage.

The horizontal period detector 10 and the vertical phase detector 15 respectively produce the digital data $\Delta H$ and $\Delta V$ which are plotted along the axes of $\Delta H$ and $\Delta V$, respectively, in FIG. 5. That is, −1 speed: $\Delta H=-2\alpha/262.5=32$; 0 speed: $\Delta H=-\alpha/262.5=48$; +1 speed: $\Delta H=0/262.5=64$; +2 speed: $\Delta H=+\alpha/262.5=80$; +3 speed: $\Delta H=+2\alpha/262.5=96$ and $V=-\alpha=144$; $V=-\alpha/2=128$; $V=0$ (reference phase)=112; $V=-\alpha/2=96$ and $V=-\alpha=80$.

Dotted lines F1 to F4 in FIG. 5 are boundary lines when jumps of +1 and −1 pitches (or +3 and −3 pitches) are not restricted, as disclosed in Japanese Patent Application No. 56/20387. Boundary lines F2 and F3 are respectively expressed by the x and y coordinates as follows:

$$F3: y=-x+192 \tag{14}$$

$$F2: y=-x+160 \tag{15}$$

In the 0 pitch jump region between the boundary lines F2 and F3, the sum data $(X+Y=\Delta H+\Delta V)$ of the outputs from the adders 16 and 17 satisfies the relation:

$$160<\Delta H+\Delta V<192 \tag{16}$$

Since 192 and 160 are 01100000 and 01010000, respectively, in the binary notation, the 0 pitch jump region may be represented by a code (0101) of the 4 more significant bits of the sum data.

In the same manner, the codes of the respective jump regions defined by the boundary lines F1 to F4 in FIG. 5 are as shown in Table 1 below:

TABLE 1

| Jump Region | Code | Converted Code | Converted Jump region |
|---|---|---|---|
| +3 | 0010 | 0011 | |
| +2 | 0011 | 0011 | +2 |
| +1 | 0100 | 0101 | |
| 0 | 0101 | 0101 | 0 |
| −1 | 0110 | 0111 | |
| −2 | 0111 | 0111 | −2 |
| −3 | 1000 | 1001 | −4 |

The code is supplied to the decoder 18 and is converted into a signal appearing on the output line of each jump signal.

In order to provide the codes corresponding to jump regions A (+2), B (0) and C (−2) of the embodiment shown in FIG. 2, a switch 19a shown in FIG. 3 is switched to the positive contact. Then, the least significant bits of the respective codes in Table 1 above become 1s and the converted codes shown in Table 1 are obtained. These converted codes represent the jump regions corresponding to the regions A (+2), B (0) and C (−2).

The jump regions in this manner are non-symmetrical with respect to the origin of the $\Delta H-\Delta V$ coordinates.

Therefore, the scale of the $\Delta V$ axis, for example, is changed so as to provide the jump regions defined by the boundary lines C1 and C2, shown in FIG. 5. For this purpose, a switch 19b cooperative with the switch 19a is connected to the positive contact so as to shift the reference phase from the vertical phase detector 15 by $\alpha/2$ (½ pitch). Upon such a change, the origin of the $\Delta H - \Delta V$ coordinates changes from (64, 112) to (64, 128) on the x−y coordinate system.

As a result of this, the boundary lines C1 and C2 are respectively expressed using the x and y coordinates as follows:

$$C1: y = -x + 96 \tag{17}$$

$$C2: y = -x + 160 \tag{18}$$

These lines are symmetrical with respect to the origin of the $\Delta H - \Delta V$ coordinate system. For example, the sum data satisfies the following relation in the 0 jump region B:

$$96 < \Delta H + \Delta V < 160 \tag{19}$$

When the switch 19a is connected to the positive contact as shown in FIG. 3, the output from the adder 17 represents the code (0101) for the 0 jump region B. Similarly, the output from the adder 17 represents the code (0011) for the +2 jump region A and the code (0111) for the <2 jump region B.

Figure 6:
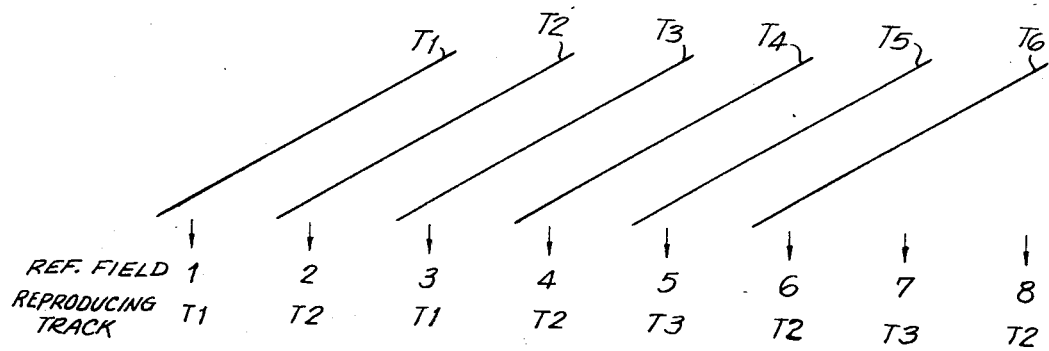
FIG. 6 is a track pattern diagram showing the tracing method for slow reproduction according to the 2 pitch jump method.

FIG. 6 is a track pattern diagram showing the tracking mode in the ¼ slow reproduction mode by the 2 pitch jump method according to the embodiment of the present invention. As has been described above, the VTR of this embodiment has a known capstan servo system which can make the odd/even order of the fields of the reproduced signals during normal reproduction coincide with that of the external reference synchronizing system. In order to effect the slow or still reproduction mode, the operation of the capstan servo system is stopped and the tape speed is slowed down or stopped to perform required slow reproduction or still reproduction, respectively. If the tracing control system of 2 pitch jump operates in the manner as described above, the reproducing or scanning track is transferred to the adjacent track for each field as shown in FIG. 6. Therefore, the odd/even order of the fields may not be disturbed with reference to the reference synchronizing signal.

In the still reproduction mode, frame control is performed such that two adjacent tracks are alternately scanned for each field. Therefore, if framing has been appropriately performed prior to still reproduction, framing may not be disturbed during still reproduction.

In the embodiment described above, the jump regions are classified or discriminated in accordance with the deviation of the phase of the reproduction phase representing signal operating at the terminal end of the track relative to the reference phase signal. However, another reproduction phase representing signal appearing at the center of the track may alternatively be compared with the reference phase signal. In this case, the boundary lines to determine the jump pitch are different from those shown in FIG. 2 but may be easily obtained in a similar manner. The jump signal may also be generated in accordance with the sum data of the data $\Delta H$ and $\Delta V$. Discrimination of the respective regions defined by the boundary lines may be performed by an analog or digital level comparator in place of the adders 16 and 17. The switches 19a and 19b of the above embodiment shown in FIG. 3 may be manually operated or may be automatically operated by detection of a certain range (e.g., −1 speed to +1 speed) of the various speed reproduction modes of the VTR.

A tracing system may be provided which performs jumps only in units of 2 pitches. In such a system, the switches 19a and 19b as shown in FIG. 3 need not be used. If the $\Delta H - \Delta V$ coordinate system (data $\Delta H$ and $\Delta V$) is determined such that the relations to determine the jump boundary lines are determined by relations (17) and (18) on the x−y coordinate system, the respective jump regions A (+2), B (0) and C (−2) may be represented by codes 01, 10 and 11, respectively, which are the 2nd and 3rd bits of the data output from the adder 17. In this case, the 1st and 4th bits are not required.

Although the present invention is mainly applicable to a single-head VTR, it is also applicable to a VTR of 1.5 head type which has a subhead for synchronizing signals.

In summary, according to the present invention, a jump of a pitch equal to an even multiple of a track pitch or a 0 pitch jump is performed, so that the head may take a jump to the initial end of the next track upon completing each tracing. According to this jump method, since the head is always transferred to the adjacent track upon completing scanning of a given track, the odd/even order of the fields of the reproduced signals may not be disturbed, and extrememly stable reproduction may be performed.

What is claimed is:

1. Apparatus for reproducing video signals recorded on a recording medium in successive parallel tracks having a predefined pitch and which are skewed relative to a direction of movement of said medium, said apparatus comprising:

signal transducer means repeatedly scanning said recording medium in a direction along said tracks for reproducing the video signals from said successive tracks upon said movement of said medium at a predetermined speed;

transducer deflecting means responsive to drive signals for deflecting said signal transducer means in a direction transverse to the direction of said tracks;

means for generating a plurality of types of jump signals of different respective amplitudes to cause said transducer deflecting means to select the track scanned by said signal transducer means, each of said types of jump signals corresponding to a displacement of said signal transducer means by a respective number 2m of track pitches, wherein m is an integer;

phase detector means for detecting a phase signal included in said video signal reproduced by said signal transducer means and generating reproduced phase signals therefrom;

speed detector means for detecting said predetermined speed of said medium and generating detected speed signals in response thereto;

selector means responsive to control signals for selectively supplying one of said types of jump signals to said transducer deflecting means when said signal transducer means reaches an end of each of said successive tracks; and controller means responsive to said reproduced phase signals and said detected speed signals for generating said control signals for said selector means.

2. The apparatus of claim 1, wherein a phase signal is recorded at a preselected position on each of said tracks; and wherein said phase detector means detects said phase signal reproduced by said signal transducer means.

3. The apparatus of claim 2; and further comprising reference signal generating means for generating reference signals; and wherein said phase detector means compares the reproduced phase signals with said reference signals.

4. The apparatus of claim 2; wherein said phase signal is a vertical synchronizing signal recorded at said preselected position on each of said tracks.

5. The apparatus of claim 1, wherein each of said tracks has a beginning end and a terminal end; and further comprising tracking control means for generating drive signals for said transducer deflecting means for positioning said signal transducer means to scan each track from said beginning end to said terminal end thereof.

6. The apparatus of claim 1; wherein said means for generating said plurality of types of jump signals includes additional means for generating jump signals corresponding to a displacement of said signal transducer means by an odd number of track pitches, and means for rendering inoperative said additional means.

* * * * *